US012781710B2

(12) United States Patent
Rautmann

(10) Patent No.: US 12,781,710 B2
(45) Date of Patent: Nov. 3, 2026

(54) METHOD FOR CONTROLLING THE QUALITY OF A WIND TURBINE ROTOR BLADE

(71) Applicant: Nordex Energy SE & Co. KG, Hamburg (DE)

(72) Inventor: Christof Rautmann, Hamburg (DE)

(73) Assignee: Nordex Energy SE & Co. KG, Hamburg (DE)

(*) Notice: Subject to any disclaimer, the term of this patent is extended or adjusted under 35 U.S.C. 154(b) by 281 days.

(21) Appl. No.: 18/597,542

(22) Filed: Mar. 6, 2024

(65) Prior Publication Data

US 2024/0247641 A1 Jul. 25, 2024

Related U.S. Application Data

(63) Continuation of application No. PCT/EP2022/074599, filed on Sep. 5, 2022.

(30) Foreign Application Priority Data

Sep. 13, 2021 (EP) .................................... 21196354

(51) Int. Cl.
*F03D 13/30* (2016.01)
*G01M 1/12* (2006.01)
*G01M 7/02* (2006.01)

(52) U.S. Cl.
CPC ............ *F03D 13/30* (2016.05); *G01M 1/122* (2013.01); *G01M 7/025* (2013.01); *F05B 2230/80* (2013.01); *F05B 2260/83* (2013.01)

(58) Field of Classification Search
CPC ....... F03D 13/30; G01M 1/122; G01M 7/025; G01M 5/005; G01M 5/0066;
(Continued)

(56) References Cited

U.S. PATENT DOCUMENTS 11,136,962 B2 * 10/2021 Pedersen ............... F03D 7/0224
11,409,249 B1 * 8/2022 Udengaard ............ G06F 30/20
(Continued)

FOREIGN PATENT DOCUMENTS

CN 107328524 A 11/2017
EP 3 034 861 A1 6/2016
(Continued)

OTHER PUBLICATIONS

International Preliminary Report on Patentability of The International Bureau of WIPO dated Mar. 5, 2024 for international application PCT/EP2022/074599 on which this application is based.
(Continued)

*Primary Examiner* — Toan N Pham
(74) *Attorney, Agent, or Firm* — Walter Ottesen, P.A.

(57) ABSTRACT

A method is for controlling the quality of a wind turbine rotor blade. The method includes: manufacturing of a wind turbine rotor blade at a manufacturing site, placing the wind turbine rotor blade on a support at the manufacturing site, applying a dynamic load to the wind turbine rotor blade while the wind turbine rotor blade is placed on the support in order to excite a vibration of the wind turbine rotor blade, detecting the vibration of the wind turbine rotor blade, determining an eigenfrequency of the wind turbine rotor blade based on the detected vibration, comparing the determined eigenfrequency with an expected eigenfrequency of the wind turbine rotor blade and evaluating the quality of the wind turbine rotor blade based on the results of the comparison.

19 Claims, 2 Drawing Sheets

(58) Field of Classification Search
CPC ............... G01M 5/0075; G01M 7/027; G01M 5/0058; F05B 2230/80; F05B 2260/83; Y02E 10/72; Y02P 70/50
See application file for complete search history.

(56) References Cited

U.S. PATENT DOCUMENTS

| | | | | |
|---|---|---|---|---|
| 12,130,211 | B2 * | 10/2024 | Christiansen ......... | G01M 7/027 |
| 2019/0010928 | A1 | 1/2019 | Vind et al. | |

FOREIGN PATENT DOCUMENTS

| | | | | |
|---|---|---|---|---|
| EP | 3 296 715 | A1 | 3/2018 | |
| EP | 3296715 | B1 * | 9/2019 | ............ G01M 7/027 |
| EP | 3 423 711 | B1 | 5/2020 | |
| WO | 2012/054937 | A1 | 4/2012 | |
| WO | 2015/046651 | A1 | 4/2015 | |

OTHER PUBLICATIONS

International Search Report of the European Patent Office dated Jan. 2, 2023 for international application PCT/EP2022/074599 on which this application is based.
Written Opinion of the International Searching Authority dated Jan. 2, 2023 for international application PCT/EP2022/074599 on which this application is based.
Extended European Search Report of the European Patent Office dated Feb. 11, 2022 for European application 21196354.1 on which this application is based.

* cited by examiner

METHOD FOR CONTROLLING THE QUALITY OF A WIND TURBINE ROTOR BLADE

CROSS-REFERENCE TO RELATED APPLICATIONS

This application is a continuation application of international patent application PCT/EP2022/074599, filed Sep. 5, 2022, designating the United States and claiming priority from European application 21196354.1, filed Sep. 13, 2021, and the entire content of both applications is incorporated herein by reference.

BACKGROUND

In the design phase of wind turbine rotor blades, it is common practice to perform extensive testing of wind turbine rotor blade prototypes in dedicated test stands. Such testing typically includes mounting the wind turbine rotor blade root to a fixed test stand at a dedicated wind turbine rotor blade testing facility. The wind turbine rotor blade is then equipped with various sensors and subjected to different static and dynamic loads. However, such testing is too time-consuming and costly for being applied to every single wind turbine rotor blade during series production. Quality control in most cases is therefore limited to visual inspection and measurement of a few simple parameters, such as the overall weight and the position of the center of gravity.

The document EP 3 034 861 B1 discloses a wind turbine rotor balancing method. The wind turbine rotor blades are manufactured and their masses and centers of gravity are measured. A balancing mass may be placed in a balancing chamber of at least one of the wind turbine rotor blades, and selected wind turbine rotor blades are combined to form a wind turbine rotor having an imbalance within tolerances.

The document US 2019/0010928 discloses a method for weighing a wind turbine rotor blade supported at its root end and at its tip end. The horizontality of the wind turbine rotor blade is adjusted before the tip load and the root load are recorded.

The document WO 2015/046651 A1 discloses a measurement method for a center of gravity of a wind turbine rotor blade. The wind turbine rotor blade is seated on first and second weight measurement units placed at the root and tip ends. Distances between an edge of the wind turbine rotor blade root and intermediate positions of the first and second weight measurement units are measured. A controller calculates the center of gravity based on measured weight and distance data.

The document WO 2012/054937 A1 discloses a test stand for wind turbine rotors. In the field, wind turbine rotor blades are attached to a wind turbine rotor hub. Before the wind turbine rotor is mounted to a shaft of the wind turbine, a proof test is performed to validate the mass and stiffness characteristics of the blades, possibly including a determination of the natural frequencies of the blade/hub assembly. Either the hub or the rotor blades are anchored to the ground. The position or motion of the non-anchored element(s) is/are controlled by one or more actuators.

SUMMARY

It is an object of the disclosure to provide a method of controlling the quality of a wind turbine rotor blade that can be carried out easily on a routine basis and offers superior information on whether the wind turbine rotor blade was manufactured according to specifications.

This object is, for example, achieved by a method for controlling the quality of a wind turbine rotor blade which includes:

- manufacturing a wind turbine rotor blade at a manufacturing site,
- placing the wind turbine rotor blade on a support at the manufacturing site,
- applying a dynamic load to the wind turbine rotor blade while the wind turbine rotor blade is placed on the support in order to excite a vibration of the wind turbine rotor blade,
- detecting the vibration of the wind turbine rotor blade,
- determining an eigenfrequency of the wind turbine rotor blade based on the detected vibration,
- comparing the determined eigenfrequency with an expected eigenfrequency of the wind turbine rotor blade and
- evaluating the quality of the wind turbine rotor blade based on the results of the comparison.

The method is carried out at a manufacturing site of the wind turbine rotor blade. It is intended to apply the method as a routine control step, in particular in the finishing process of the wind turbine rotor blade, that is at a late stage of production, in order to ensure that only wind turbine rotor blades that have been evaluated as to their eigenfrequency will leave the factory. In this regard, the step of manufacturing the wind turbine rotor blade may be essentially completed before the wind turbine rotor blade is placed on the support. In particular, if the wind turbine rotor blade is assembled from two separate half-shells, this step will be completed so that the wind turbine rotor blade will have its final shape. Other manufacturing steps having little or no influence on the mechanical properties of the wind turbine rotor blade, such as, for example, an application of a surface finish and/or assembly of add-on equipment such as sensors and/or lightning protection systems can be completed before placing the wind turbine rotor blade on the support as well, but these could also be carried out later.

The wind turbine rotor blade is then placed on a support. The support may include one or more defined contact surfaces onto which the wind turbine rotor blade is laid. These contact surfaces may be the only elements of the support getting in contact with the wind turbine rotor blade. However, the support may in addition include one or more specific support elements fastened to the wind turbine rotor blade, for example, a beam structure fastened to the wind turbine rotor blade, for example, to a root section thereof, for example, by one or more bolts. These specific support elements may simply rest on the ground or on a padding or may be held in a bearing. However, in contrast to a dedicated test stand, they will not be fixed completely in position relative to a ground, but will be able to move with the wind turbine rotor blade when the same vibrates.

Once the wind turbine rotor blade is placed on the support, a dynamic load is applied in order to excite a vibration of the wind turbine rotor blade. The dynamic load may be a single pulse transferring a defined momentum, for example, applied via a colliding object, but may also include several periodic excitations. The dynamic load is applied such that the wind turbine rotor blade is subject to a certain deformation and is temporarily deflected from a rest position.

While the wind turbine rotor blade returns to its rest position, the vibration of the wind turbine rotor blade excited by the dynamic load is detected so that a frequency of the vibration corresponding to an eigenfrequency of the wind turbine rotor blade can be determined. As a next step, the determined eigenfrequency is compared to an expected eigenfrequency, that is to an eigenfrequency the wind turbine rotor blade will have when manufactured according to its specifications. The expected eigenfrequency may have been obtained during the design phase of the wind turbine rotor blade, either by calculation or by a specific measurement. It is also possible to set the expected eigenfrequency based on an eigenfrequency that has been determined in accordance with the related steps of various methods according to the disclosure for a wind turbine rotor blade that is placed on the support and has been found to comply with the specifications.

In a further step, the quality of the wind turbine rotor blade is evaluated based on the results of the comparison. As a result, it may for example be recorded that the eigenfrequency of the wind turbine rotor blade is within a predetermined tolerance.

The inventor realized that today's standard procedures for controlling the quality of wind turbine rotor blades by evaluating the quality essentially based on the mass and center of gravity require an ever increasing precision to detect relevant deficiencies in view of larger and more slender wind turbine rotor blade configurations. In addition, some manufacturing imperfections will have only very limited influence on the mass and center of gravity, while they may nevertheless cause significant safety risks when the wind turbine rotor blade is operated in extreme conditions. These may become apparent only after some damage has occurred.

With the various methods according to the disclosure, a superior quality control can be achieved because otherwise undetected deficiencies can be revealed. As a consequence, the risk of blade damages in the field can be reduced. At the same time, in some cases larger tolerances can be allowed with regard to mass and center of gravity as long as the evaluation of the determined eigenfrequency renders a positive result. In these cases, repair works might be skipped or kept to a minimum need.

All of these advantages can be realized with methods according to the disclosure, which are relatively simple and can be performed in a short time, on a routine basis and at low costs per blade. In particular, the equipment necessary to carry out the invention can be used for multiple different types of wind turbine rotor blades. In many cases, only one system will be needed for a manufacturing site.

According to an aspect, the support is portable. This means no permanent installation of the support at the manufacturing site is required. If not in use, the support and possibly any other elements of the system can be stored at any desired location. It is also possible to move the system to different locations at the manufacturing site, for example by placing the support on wheels, if desired even with a wind turbine rotor blade supported thereon.

According to an aspect, the support includes a first support supporting a root section of the wind turbine rotor blade and a second support supporting a midsection of the wind turbine rotor blade. The second support may include a contact surface, the wind turbine rotor blade when placed on the support resting on the contact surface. For example, the contact surface may be formed by a belt. The first support may include such a contact surface as well, but may also include one or more specific support elements fastened to the wind turbine rotor blade, in particular as has been discussed above.

According to an aspect, the step of detecting a vibration of the wind turbine rotor blade is performed via at least one sensor which is integrated into or attached to the second support. It was found that the vibration can best be detected in some distance from the wind turbine rotor blade root, in particular at the midsection where the second support is arranged. It is not necessary to attach any measurement equipment such as a sensor directly to the wind turbine rotor blade. The at least one sensor can be an acceleration sensor, for example.

According to an aspect, the step of detecting a vibration includes detecting a vibration in flapwise direction and/or detecting a vibration in edgewise direction of the wind turbine rotor blade. The flapwise direction corresponds to a profile height, the edgewise direction corresponds to a profile chord. The vibration in any one or both of these directions can be important for quality control purposes. To detect the vibration in each direction, separate sensors or a combined sensor can be used.

According to an aspect, the step of determining an eigenfrequency of the wind turbine rotor blade includes determining any combination of the following eigenfrequencies:

a first eigenfrequency in flapwise direction,
a second eigenfrequency in flapwise direction,
a first eigenfrequency in edgewise direction,
a second eigenfrequency in edgewise direction,
a first torsional eigenfrequency,
a second torsional eigenfrequency.

Each of these frequencies may be of particular interest for quality control purposes. In an aspect, at least the first and second eigenfrequencies in flapwise and edgewise directions are detected and compared to the related expected eigenfrequencies.

According to an aspect, the method is carried out fully automatically. To this end, a controller may be connected to a device applying the dynamic load and to a device detecting the vibration. The controller may also determine the eigenfrequency. This means, no human interaction is required once the wind turbine rotor blade has been placed on the support at least until the eigenfrequency has been determined. Of course, the following steps of comparing the eigenfrequency to the expected eigenfrequency and of evaluating the quality of the wind turbine rotor blade can be carried out automatically as well.

According to an aspect, the dynamic load is applied in flapwise direction, in edgewise direction or in a direction inclined with regard to the flapwise direction and with regard to the edgewise direction of the wind turbine rotor blade. This makes it possible to excite vibrations in both directions, either separately/consecutively or at the same time.

According to an aspect, the dynamic load is applied to the support, in particular by an excitation device integrated into or attached to the second support. The dynamic load is then transferred from the second support to the wind turbine rotor blade placed thereon. This means no specific equipment needs to be mounted to the wind turbine rotor blade for excitation purposes.

According to an aspect, the method includes the additional step of measuring a mass of the wind turbine rotor blade while the wind turbine rotor blade is placed on the support. To this end, the support may include a weight scale. The total mass of the wind turbine rotor blade can be measured on the same support which is used to determine the eigenfrequency.

According to an aspect, the second support is placed at a defined length position of the wind turbine rotor blade such that the measured eigenfrequency corresponds to an eigenfrequency of the wind turbine rotor blade when fastened to a wind turbine rotor blade hub. This aspect takes into account that the wind turbine rotor blade's eigenfrequency when placed on a support will always deviate slightly from its eigenfrequency when in use, that is when fastened to a wind turbine rotor blade hub. Placing the second support at the defined length position leads to a small deviation which is negligible or at least acceptable for quality control purposes. The defined length position can be determined for each blade type, for example, in a computer simulation or experimentally. The defined length position may be close to the wind turbine rotor blade's center of gravity, such as in a distance therefrom of less than 15%, of less than 10% or of less than 5% of the wind turbine rotor blade's total length. For safety reasons, a minimal distance from the center of gravity should be maintained.

According to an aspect, the method includes the additional steps of determining a first weight carried by the first support, a second weight carried by the second support and determining a center of gravity of the wind turbine rotor blade placed on the support based on the first weight and on the second weight. In this aspect, both supports are equipped with a weight scale. As is known from prior art methods, the center of gravity can be important for quality control purposes as well. Here, it can be measured on the same support used for the eigenfrequency determination.

According to an aspect, the first support includes at least one beam structure fastened to a root of the wind turbine rotor blade and resting on a ground. In particular, the beam structure may include two beams reaching from the rotor blade root to the ground. These two vertical beams may be connected by one or more cross bars, in particular such that the beam structure forms an A-shape. Beam structures of this simple construction are commonly used to support wind turbine rotor blades during various manufacturing steps as well as for storage purposes. Surprisingly, it was found that they can also be used as support for various methods according to the disclosure, as they do not seem to affect the vibration behavior of the wind turbine rotor blade more than acceptable.

According to an aspect, if the determined eigenfrequency differs from the expected eigenfrequency by more than a predetermined tolerance, one or more of the following additional steps are performed: (i) refinishing the wind turbine rotor blade, in particular by adding or removing mass and/or stiffness to/from the wind turbine rotor blade, preferably by laminating an additional layer of reinforcing fibers onto the wind turbine rotor blade, (ii) combining the wind turbine rotor blade with other wind turbine rotor blades to a wind turbine rotor having acceptable dynamic behavior, (iii) assigning the wind turbine rotor blade to a non-critical wind turbine which will not be operated in a mode which is incompatible with the measured eigenfrequency. These alternatives show that the evaluation according to the disclosure based on the eigenfrequency offers different, valuable options for further use of a wind turbine rotor blade initially not fully meeting the requirements.

BRIEF DESCRIPTION OF DRAWINGS

The invention will now be described with reference to the drawings wherein.

DETAILED DESCRIPTION

Figure 1:
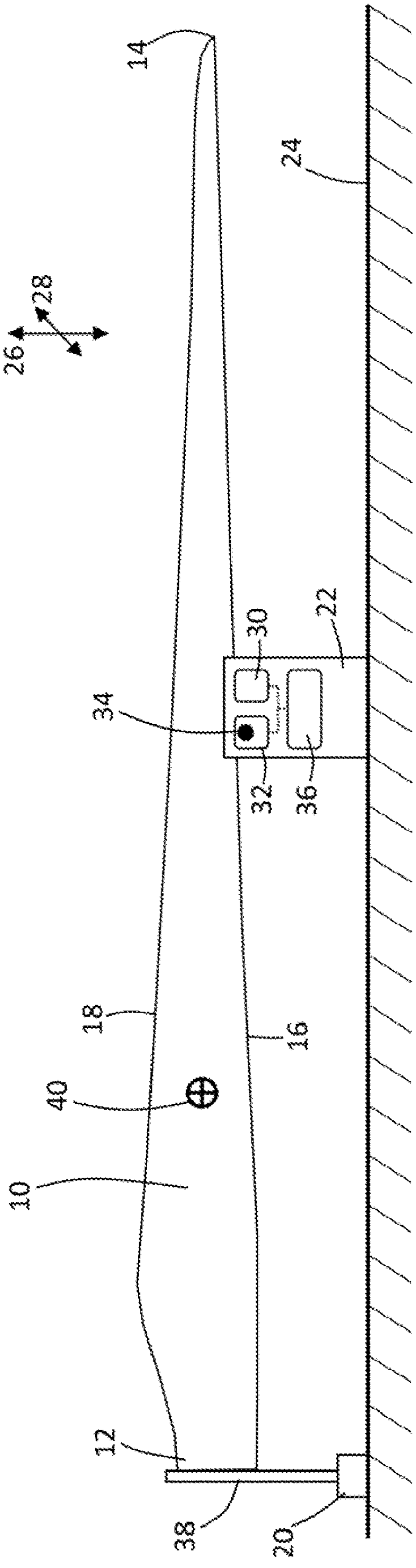
FIG. 1 shows a wind turbine rotor blade placed on a support in a schematic view; and, FIG. 2 shows a flow chart including seven steps according to a method according to the disclosure.

The wind turbine rotor blade 10 of FIG. 1 has a wind turbine rotor blade root 12, a wind turbine rotor blade tip 14, a leading edge 16, a trailing edge 18, a center of gravity 40 and an aerodynamic profile with a suction side and a pressure side (not shown). The wind turbine rotor blade 10 is placed on a support including a first support 20 and a second support 22. Both supports 20, 22 are portable and standing on a ground 24 at a manufacturing site.

In the position shown, a longitudinal axis of the wind turbine rotor blade is arranged horizontally and the leading edge 16 is pointing downwards. The edgewise direction 26 of the wind turbine blade is arranged essentially vertically, the flapwise direction 28 is arranged essentially horizontally, orthogonal to the drawing plane.

Integrated into the second support 22, there is an excitation device 30 for applying a dynamic load to the second support 22 as well as a device 32 for detecting the vibration of the wind turbine rotor blade 10. The device 32 for detecting the vibration of the wind turbine rotor blade 10 includes a sensor 34, namely an acceleration sensor.

A controller 36 is connected to both devices 30, 32 and is adapted for determining an eigenfrequency of the wind turbine rotor blade 10 based on a detected vibration and for comparing the determined eigenfrequency with an expected eigenfrequency of the wind turbine rotor blade 10. Based on the results of the comparison, the controller 36 may also evaluate the quality of the wind turbine rotor blade 10. The controller 36 may be arranged remote from the devices 30, 32, for example close to the blade root 12, and may be connected to the devices 30, 32 by wires or wirelessly.

The first support 20 includes a beam structure 38 with at least one beam fastened to the wind turbine rotor blade root 12.

Figure 2:
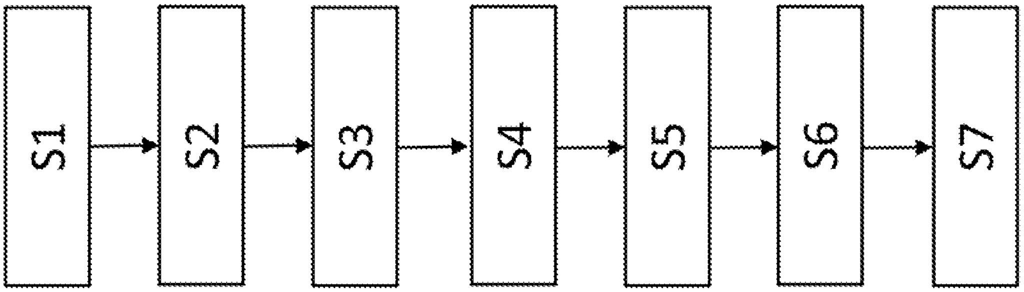

FIG. 2 shows a flow chart including seven steps according to methods of the disclosure, which is explained with the help of the device shown in FIG. 1.

In a first step S1, a wind turbine rotor blade 10 is manufactured at a manufacturing site. Preferably it is completely finished including a layer of paint and/or is equipped with additional aerodynamic features and/or a heating device.

In a further step S2, the rotor blade 10 is moved by a crane in the manufacturing site from the finishing slot to a test slot and placed on a support 20, 22. A first support 20 is provided by a root support frame in the shape of a beam structure 38, which is used during the finishing work and can remain in its position at the rotor blade root 12 and is moved together with the rotor blade 10. The second support 22 including the measurement equipment is arranged at a distance from the root 12 on the ground 24.

In a further step S3 a dynamic load is applied to the wind turbine rotor blade 10 while resting on the support 20, 22 in order to excite a vibration of the wind turbine rotor blade 10. The excitation device 30 is located at the second support 22.

In a further step S4 a vibration of the wind turbine rotor blade 10 is detected via an acceleration sensor 34, which is located at the second support 22 as well.

In a further step S5 an eigenfrequency of the wind turbine rotor blade 10 is determined by a controller 36 based on the detected vibration.

In a further step S6 the controller 36 compares the determined eigenfrequency with an expected eigenfrequency of the wind turbine rotor blade 10. To this end, the controller 36 may provide for example a graphical or numerical representation of the determined eigenfrequency and the expected eigenfrequency and/or of the determined eigenfrequency in relation to corresponding minimum/maximum values of a tolerance range.

In a further step S7 the quality of the wind turbine rotor blade 10 is evaluated based on the results of the comparison. If the rotor blade is considered to be manufactured according to the requirements of the specification no further measures are necessary and the rotor blade can be assembled to the wind turbine as planned. If there are deviations, subsequent measures have to be initiated, for example, a further treatment of the rotor blade in the finishing slot. Alternative the rotor blade can be provided for a special use together with rotor blades having a similar eigenfrequency or for a special installation site.

It is understood that the foregoing description is that of the preferred embodiments of the invention and that various changes and modifications may be made thereto without departing from the spirit and scope of the invention as defined in the appended claims.

LIST OF REFERENCE NUMERALS

10 wind turbine rotor blade
12 wind turbine rotor blade root
14 wind turbine rotor blade tip
16 leading edge
18 trailing edge
20 first support
22 second support
24 ground
26 edgewise direction
28 flapwise direction
30 excitation device
32 device for detecting a vibration
34 sensor
36 controller
38 beam structure
40 center of gravity

The invention claimed is:

1. A method of controlling a quality of a wind turbine rotor blade, the method comprising:

manufacturing a wind turbine rotor blade at a manufacturing site;

placing the wind turbine rotor blade on a support at the manufacturing site;

applying a dynamic load to the wind turbine rotor blade while the wind turbine rotor blade is placed on the support to excite a vibration of the wind turbine rotor blade;

detecting the vibration of the wind turbine rotor blade;

determining an eigenfrequency of the wind turbine rotor blade based on the detected vibration;

comparing the determined eigenfrequency with an expected eigenfrequency of the wind turbine rotor blade, wherein the expected eigenfrequency was obtained during a design phase of the wind turbine rotor blade and corresponds to an eigenfrequency the wind turbine rotor blade will have when manufactured according to specifications; and, evaluating the quality of the wind turbine rotor blade based on the results of said comparing the determined eigenfrequency with the expected eigenfrequency.

2. The method of claim 1, wherein the support is portable.

3. The method of claim 1, wherein the support includes a first support supporting a root section of the wind turbine rotor blade and a second support supporting a midsection of the wind turbine rotor blade.

4. The method of claim 3, wherein said detecting the vibration of the wind turbine rotor blade is performed via at least one sensor integrated into or attached to the second support.

5. The method of claim 3, wherein the dynamic load is applied to the second support.

6. The method of claim 3, wherein the dynamic load is applied to the second support by an excitation device integrated into or attached to the second support.

7. The method of claim 3, wherein the second support is placed at a defined length position of the wind turbine rotor blade such that the determined eigenfrequency corresponds to the eigenfrequency of the wind turbine rotor blade when fastened to a wind turbine rotor blade hub.

8. The method of claim 3, wherein the first support includes at least one beam structure fastened to a root of the wind turbine rotor blade and resting on a ground.

9. The method of claim 1, wherein said detecting the vibration includes at least one of detecting a vibration in a flapwise direction and detecting a vibration in an edgewise direction of the wind turbine rotor blade.

10. The method of claim 1, wherein the step of determining an eigenfrequency of the wind turbine rotor blade includes determining at least one of:

a first eigenfrequency in a flapwise direction;

a second eigenfrequency in the flapwise direction;

a first eigenfrequency in an edgewise direction;

a second eigenfrequency in the edgewise direction;

a first torsional eigenfrequency; and, a second torsional eigenfrequency.

11. The method of claim 1, wherein the method is carried out fully automatically.

12. The method of claim 1, wherein the dynamic load is applied in a flapwise direction, in an edgewise direction or in a direction inclined with regard to the flapwise direction and with regard to the edgewise direction of the wind turbine rotor blade.

13. The method of claim 1 further comprising measuring a mass of the wind turbine rotor blade while the wind turbine rotor blade is placed on the support.

14. The method of claim 1, wherein, if the determined eigenfrequency differs from the expected eigenfrequency by more than a predetermined tolerance, the method further comprises:

refinishing the wind turbine rotor blade.

15. The method of claim 14, wherein said refinishing the wind turbine rotor blade includes adding at least one of mass and stiffness to the wind turbine rotor blade.

16. The method of claim 14, wherein said refinishing the wind turbine rotor blade includes laminating an additional layer of reinforcing fibers onto the wind turbine rotor blade.

17. The method of claim 1, wherein, if the determined eigenfrequency differs from the expected eigenfrequency by more than a predetermined tolerance, the method further comprises:

combining the wind turbine rotor blade with other wind turbine rotor blades to a wind turbine rotor having acceptable dynamic behavior.

18. The method of claim 1, wherein, if the determined eigenfrequency differs from the expected eigenfrequency by more than a predetermined tolerance, the method further comprises:

assigning the wind turbine rotor blade to a non-critical wind turbine which will not be operated in a mode which is incompatible with the determined eigenfrequency.

19. A method of controlling a quality of a wind turbine rotor blade, the method comprising:

manufacturing a wind turbine rotor blade at a manufacturing site;

placing the wind turbine rotor blade on a support at the manufacturing site, wherein the support includes a first support supporting a root section of the wind turbine rotor blade and a second support supporting a midsection of the wind turbine rotor blade;

applying a dynamic load to the wind turbine rotor blade while the wind turbine rotor blade is placed on the support to excite a vibration of the wind turbine rotor blade;

detecting the vibration of the wind turbine rotor blade;

determining an eigenfrequency of the wind turbine rotor blade based on the detected vibration;

comparing the determined eigenfrequency with an expected eigenfrequency of the wind turbine rotor blade;

evaluating the quality of the wind turbine rotor blade based on the results of said comparing the determined eigenfrequency with the expected eigenfrequency;

determining a first weight carried by the first support and a second weight carried by the second support; and, determining a center of gravity of the wind turbine rotor blade placed on the support based on the first weight and on the second weight.

* * * * *